(12) United States Patent
Chen et al.

(10) Patent No.: US 7,630,203 B1
(45) Date of Patent: Dec. 8, 2009

(54) IC CARD

(75) Inventors: Ie Sen Chen, Taipei Hsien (TW); Chih Nung Chen, Taipei Hsien (TW); Wei Chia Huang, Taipei Hsien (TW)

(73) Assignee: Ardi Technology Corporation, Tucherng, Taipei Hsien (TW)

( * ) Notice: Subject to any disclaimer, the term of this patent is extended or adjusted under 35 U.S.C. 154(b) by 0 days.

(21) Appl. No.: 12/283,976

(22) Filed: Sep. 17, 2008

(51) Int. Cl.
*H05K 7/02* (2006.01)
(52) U.S. Cl. .................. 361/737; 435/492; 257/679
(58) Field of Classification Search .......... 361/737, 361/728, 730, 752; 235/492, 441; 257/678, 257/679
See application file for complete search history.

(56) References Cited

U.S. PATENT DOCUMENTS

| | | | | |
|---|---|---|---|---|
| 4,972,580 A | * | 11/1990 | Nakamura | 29/840 |
| 6,882,541 B2 | * | 4/2005 | Maruyama et al. | 361/752 |
| 7,147,156 B2 | * | 12/2006 | Divine et al. | 235/449 |
| 7,234,347 B2 | * | 6/2007 | Harthorn et al. | 73/152.57 |
| 7,324,347 B2 | * | 1/2008 | Nakanishi et al. | 361/737 |
| 7,377,446 B2 | | 5/2008 | Ohta et al. | 235/492 |
| 7,389,937 B2 | | 6/2008 | Ito | 235/492 |
| 7,395,975 B2 | * | 7/2008 | Ito | 235/492 |
| 2005/0236490 A1 | * | 10/2005 | Fortune et al. | 235/492 |

* cited by examiner

*Primary Examiner*—Dameon E Levi
(74) *Attorney, Agent, or Firm*—Charles E. Baxley

(57) ABSTRACT

An IC card includes an opening formed in a bottom portion of a casing, a circuit board engaged into the casing, one or more batteries attached to the circuit board and received in the opening of the casing for reducing the thickness of the IC card, a processor and an antenna member are attached to the circuit board and electrically coupled together, and a cover member is attached to the casing and engaged onto the circuit board for shielding the circuit board and for retaining the circuit board in the casing, and the cover member includes a lid aligned with the batteries and openable to expose the batteries and to allow the batteries to be changed with a new one when the batteries have been consumed.

1 Claim, 5 Drawing Sheets

IC CARD

BACKGROUND OF THE INVENTION

1. Field of the Invention

The present invention relates to an integrated circuit (IC) card, and more particularly to an IC card including an internally provided antenna device, and including a structure for allowing the batteries to be changed with the new ones.

2. Description of the Prior Art

Typical IC cards comprise a number of sheet materials fused together, and one or more IC chips, one or more IC modules, and one or more antenna members, and other parts or elements attached to the sheet materials, and one or more batteries are required to be engaged into the sheet materials and coupled to the parts or elements for energizing the parts or elements.

For example, U.S. Pat. No. 7,377,446 to Ohta et al., U.S. Pat. No. 7,389,937 to Ito, and U.S. Pat. No. 7,395,975 to Ito disclose three of the typical IC cards or card-shaped memory devices each comprising one or more IC chips for controlling, memorizing, or other functions, and one or more batteries for energizing the parts or elements.

However, normally, the batteries are sealed or fused within the typical IC cards or card-shaped memory devices and may not be changed with the new ones, such that the working life of the typical IC cards or card-shaped memory devices is limited, and the typical IC cards or card-shaped memory devices should be discarded when the batteries have been consumed, and the information stored or memorized in the typical IC cards or card-shaped memory devices may longer be used or accessed.

The present invention has arisen to mitigate and/or obviate the afore-described disadvantages of the conventional IC cards or card-shaped memory devices.

SUMMARY OF THE INVENTION

The primary objective of the present invention is to provide an IC card including an internally provided antenna device, and including a structure for allowing the batteries to be changed with the new ones.

In accordance with one aspect of the invention, there is provided an IC card comprising a casing including a bottom portion having at least one opening formed in the bottom portion of the casing, a circuit board engaged into the casing, at least one battery attached to the circuit board and received in the opening of the casing, a processor attached to the circuit board and electrically coupled to the battery for signal processing purpose, an antenna member attached to the circuit board and electrically coupled to the processor for transmitting signals to the processor, and a cover member attached to the casing and engaged onto the circuit board for covering and shielding and protecting the circuit board and for retaining the circuit board in the casing, and the cover member including a lid aligned with the battery and openable to expose the battery and to allow the battery to be changed with a new one.

The circuit board includes a sound generating device attached to the circuit board and electrically coupled to the processor for generating sounds or voices. The sound generating device may be selected from a buzzer.

The casing includes a cavity formed in the bottom portion of the casing for receiving and accommodating the sound generating device. The casing includes a number of apertures formed in an upper portion of the casing and communicating with the cavity of the casing for sound transmitting purpose.

The circuit board includes a switch attached to the circuit board and electrically coupled to the processor for controlling the processor. The casing includes a notch formed therein for receiving and accommodating the switch. It is preferable that the notch of the casing is opened through one side portion of the casing.

The casing includes a depression formed therein for receiving and accommodating the processor. The casing includes a recess formed therein for receiving and accommodating the circuit board. The cover member includes an opening formed therein for engaging with the lid.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
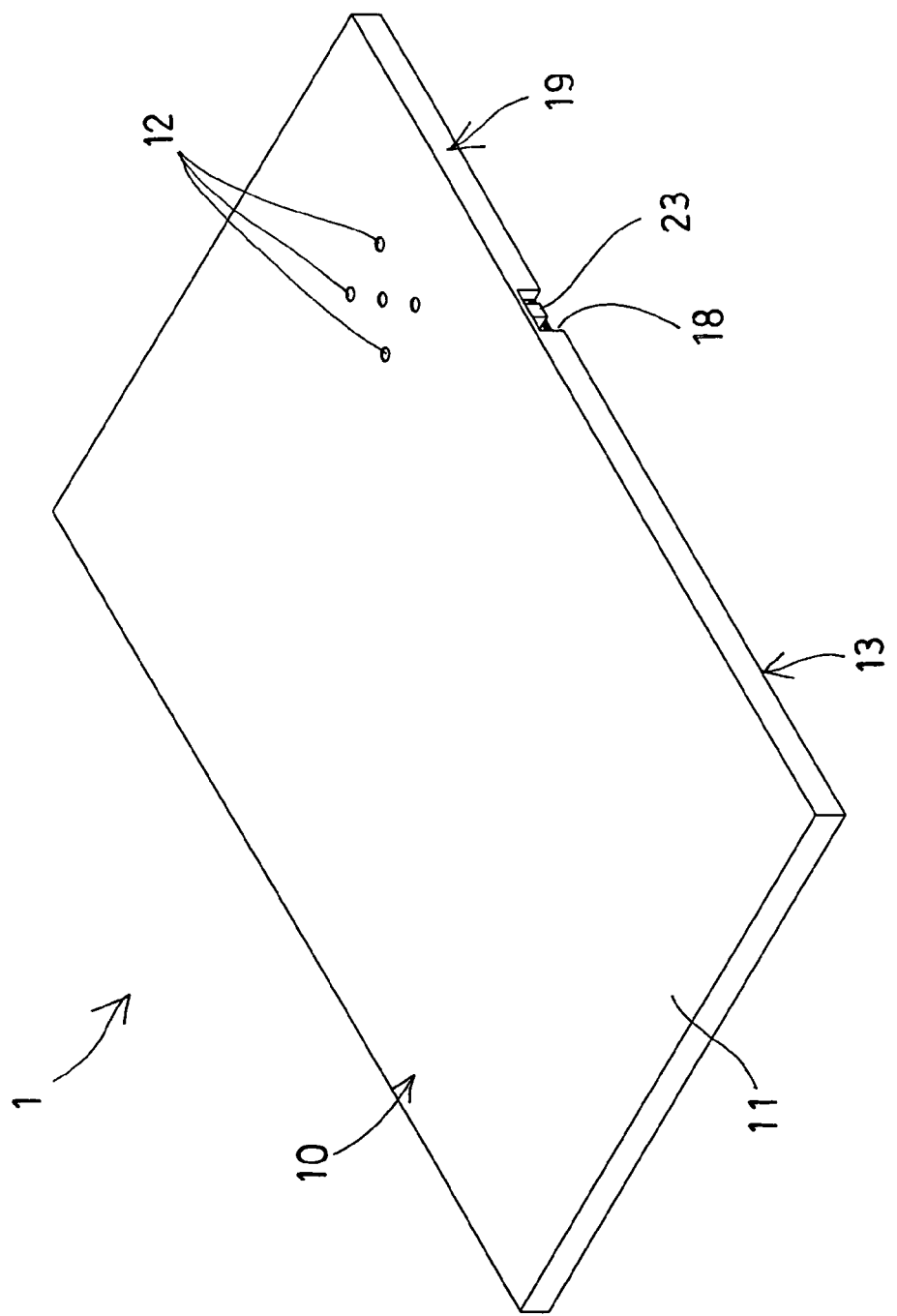
FIG. 1 is an upper perspective view of an IC card in accordance with the present invention.

Referring to the drawings, and initially to FIGS. 1-4, an IC card 1 in accordance with the present invention comprises a card body or casing 10 including an upper surface or portion 11 having one or more apertures 12 formed therein for sound transmitting purposes, and including a bottom portion 13 having a recess 14 formed therein for receiving or accommodating a circuit board 20, and including a cavity 15 formed in the bottom portion 13 of the casing 10 and communicating with the apertures 12 and the recess 14 of the casing 10, and including a depression 16 and one or more openings 17 and a notch 18 also formed in the bottom portion 13 of the casing 10 and communicating with the recess 14 of the casing 10, in which the notch 18 of the casing 10 is opened through one of the side portions 19 of the casing 10.

Figure 5:
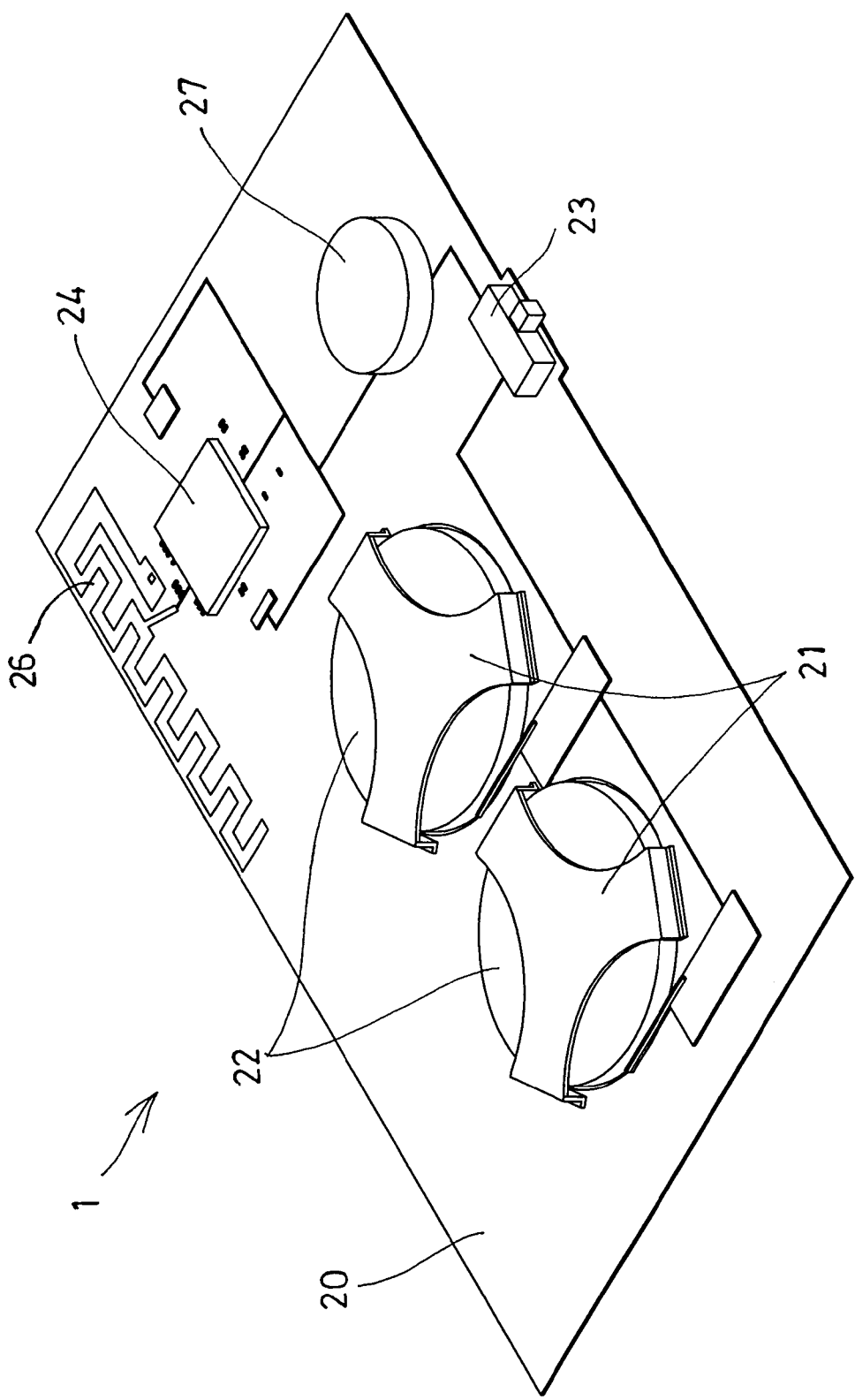
FIG. 5 is a bottom perspective view illustrating the inner structure or configuration of the IC card.

The circuit board 20 includes one or more conductors or sockets 21 formed or provided therein and engaged into the openings 17 of the casing 10 for receiving or attaching batteries 22, a switch 23 electrically coupled to the batteries 22 and received or accommodated in the notch 18 of the casing 10 for allowing the switch 23 to be actuated or moved or operated by the user. As shown in FIG. 5, an IC chip or processing unit or processor 24 is attached to the circuit board 20 and engaged into the depression 16 of the casing 10 and electrically coupled to the batteries 22 and/or the switch 23 for signal or information processing purposes, and an antenna member 26 is also attached or printed or applied onto the circuit board 20 and electrically coupled to the processor 24 for signal receiving or transmitting purposes.

Figure 2:
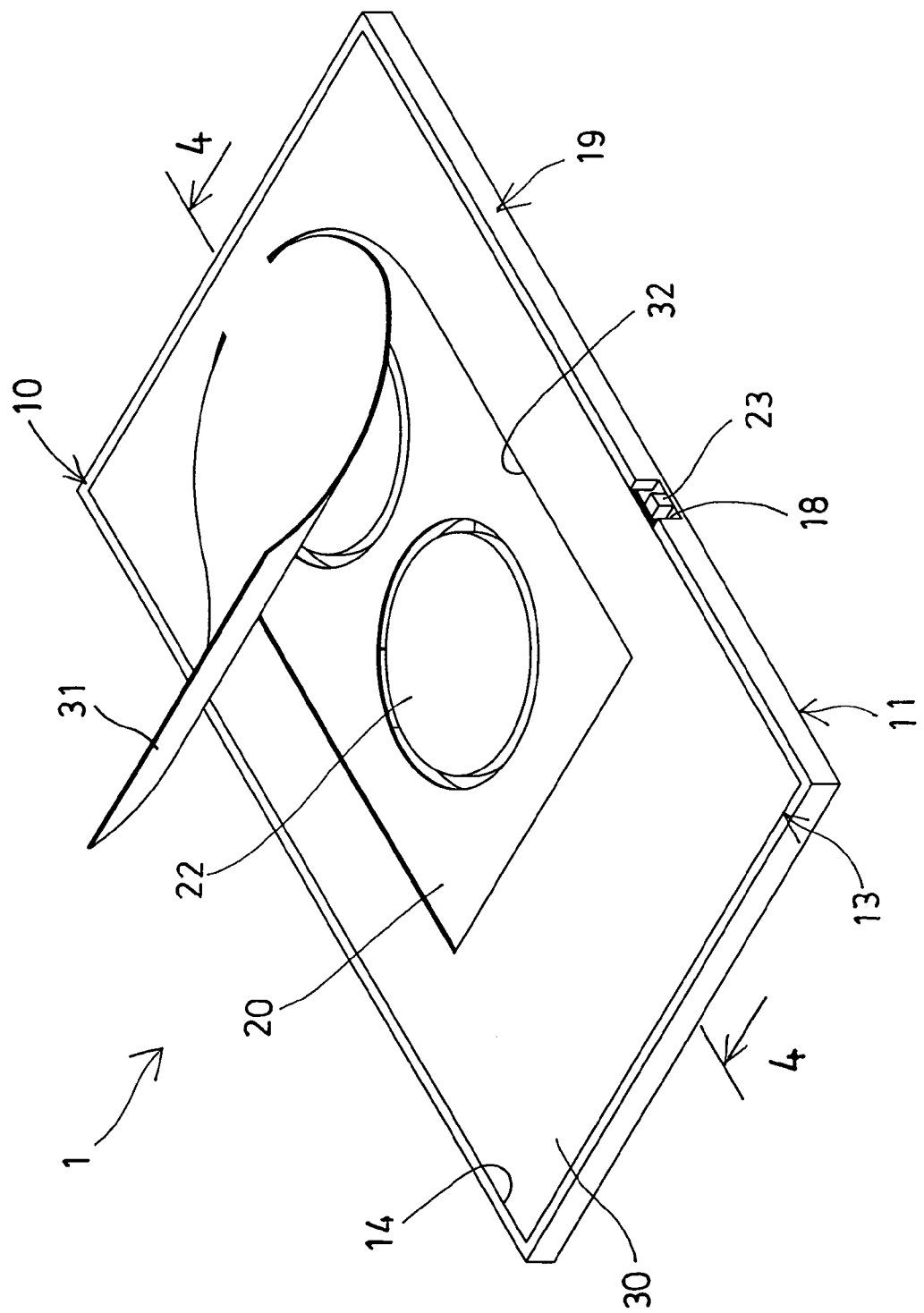
FIG. 2 is a bottom perspective view of the IC card, in which a lid is opened for showing the inner structure or configuration of the IC card.
Figure 3:
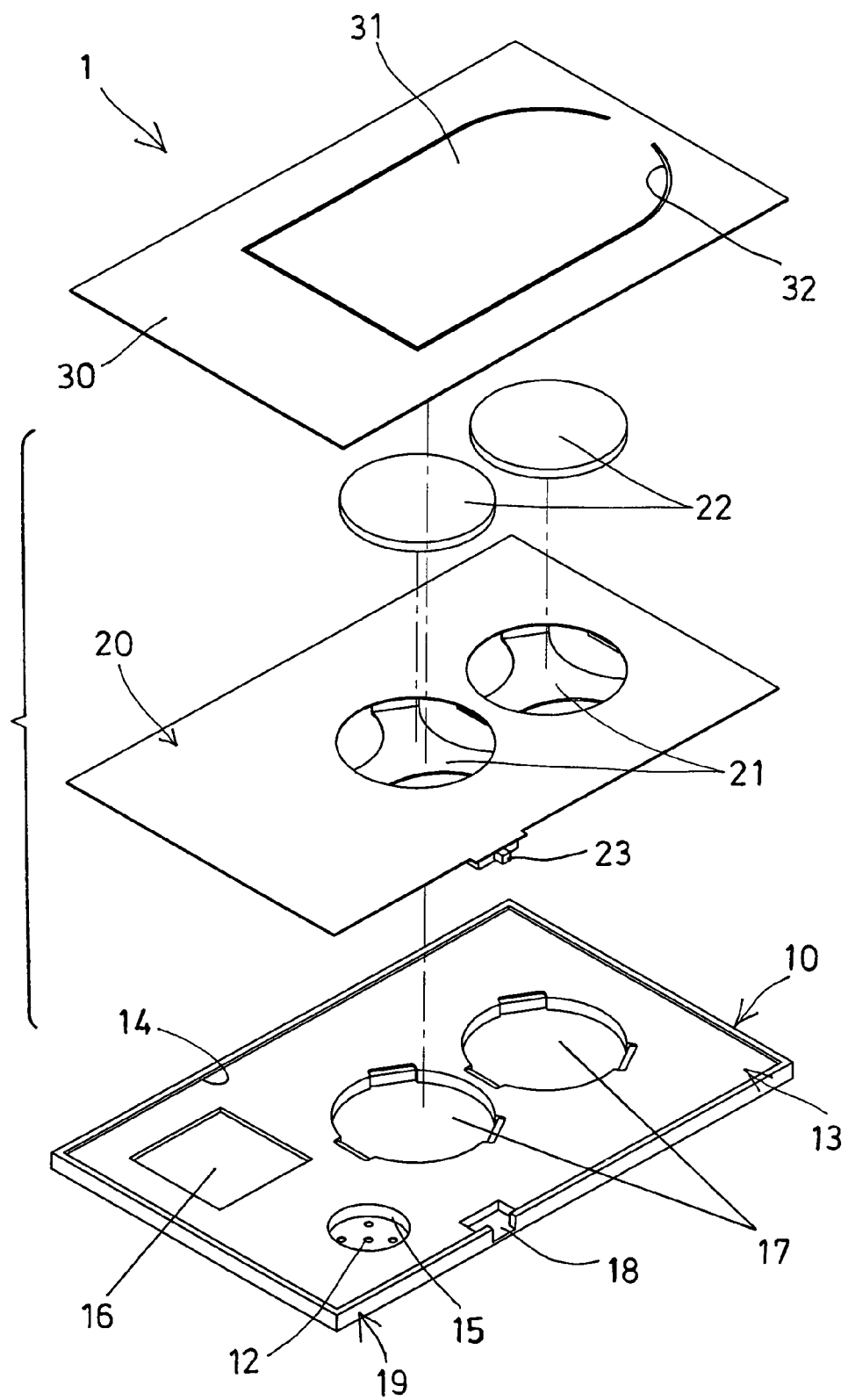
FIG. 3 is a partial exploded view of the IC card.
Figure 4:
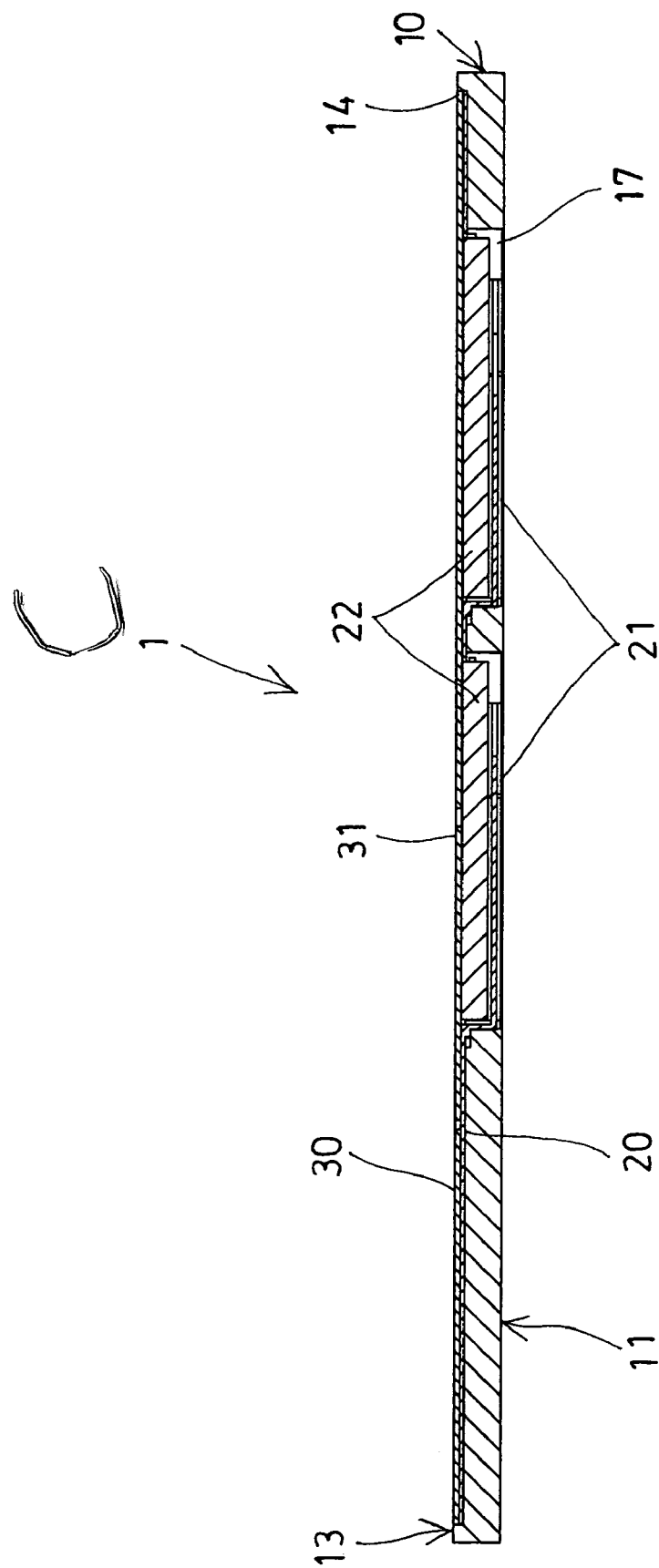
FIG. 4 is a cross sectional view of the IC card taken along lines 4-4 of FIG. 2.

As also shown in FIG. 5, a sound generating means or device 27, such as a buzzer 27 is also attached onto the circuit board 20 and engaged into the cavity 15 of the casing 10 and electrically coupled to the processor 24 and/or the switch 23 for generating sounds or voices and arranged for allowing the sounds or voices to be transmitted out through the apertures 12 of the casing 10, in which the buzzer or sound generating device 27 may generate the sounds or voices when the antenna member 26 is receiving or transmitting the signal or information, for example. As shown in FIGS. 2-4, a cover layer or member 30 is engaged into the recess 14 of the casing 10 and engaged onto the circuit board 20 for covering or shielding or protecting the circuit board 20 and for suitably retaining the circuit board 20 in the recess 14 of the casing 10.

As also shown in FIGS. 2-4, the cover layer or member 30 is made of non-conductive materials and includes a lid 31 engaged in an opening 32 and aligned with the sockets 21 or the batteries 22, and the lid 31 may be opened relative to the cover member 30 (FIG. 2) to open the opening 32 of the cover member 30 and to expose the batteries 22, and to allow the batteries 22 to be changed with the new batteries when the batteries 22 have been consumed. It is to be noted that the information stored or memorized in the processor 24 will not be lost and may still be used or accessed after the batteries 22 have been changed with the new ones such that the working life of the IC card 1 may be suitably increased. In addition, the buzzer or sound generating device 27, the processor 24, the batteries 22 and the sockets 21, and the switch 23 may be received or accommodated or engaged in the cavity 15, the depression 16, the openings 17, and the notch 18 of the casing 10 such that the thickness of the IC card 1 may be suitably decreased.

Accordingly, the IC card in accordance with the present invention includes an internally provided antenna device, and including a structure for allowing the batteries to be changed with the new ones.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. An IC card comprising:
    a casing including a bottom portion having at least one opening formed in said bottom portion of said casing, and including a cavity formed in said bottom portion of said casing, and including a plurality of apertures formed in an upper portion of said casing and communicating with said cavity of said casing for sound transmitting purpose, and including a notch formed in said casing and opened through one side portion of said casing, and including a depression formed in said casing, and including a recess formed in said casing,
    a circuit board engaged into said casing and received and accommodated in said recess of said casing,
    at least one battery attached to said circuit board and received in said at least one opening of said casing,
    a processor attached to said circuit board and received and accommodated in said depression of said casing and electrically coupled to said at least one battery for signal processing purpose,
    a sound generating device attached to said circuit board and received and accommodated in said cavity of said casing and electrically coupled to said processor for generating sounds or voices,
    a switch attached to said circuit board and received and accommodated in said notch of said casing and electrically coupled to said processor for controlling said processor,
    an antenna member attached to said circuit board and electrically coupled to said processor for transmitting signals to said processor, and
    a cover member attached to said casing and engaged onto said circuit board for covering and shielding and protecting said circuit board and for retaining said circuit board in said casing, and said cover member including an opening formed therein and including a lid engaged in said opening of said cover member and aligned with said at least one battery and openable to expose said at least one battery and to allow said at least one battery to be changed with a new one.

\* \* \* \* \*